(12) United States Patent
Schneider

(10) Patent No.: US 11,168,744 B2
(45) Date of Patent: Nov. 9, 2021

(54) CLUTCH ARRANGEMENT

(71) Applicant: ZF FRIEDRICHSHAFEN AG, Friedrichshafen (DE)

(72) Inventor: Christian Schneider, Northville, MI (US)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 16/691,133

(22) Filed: Nov. 21, 2019

(65) Prior Publication Data

US 2020/0256403 A1    Aug. 13, 2020

(30) Foreign Application Priority Data

Feb. 8, 2019   (DE) ...................... 10 2019 201 644.8

(51) Int. Cl.
*F16D 25/0638*    (2006.01)
*F16D 25/12*    (2006.01)
*F16H 45/02*    (2006.01)

(52) U.S. Cl.
CPC ....... *F16D 25/0638* (2013.01); *F16D 25/123* (2013.01); *F16H 45/02* (2013.01); *F16H 2045/021* (2013.01); *F16H 2045/0221* (2013.01); *F16H 2045/0284* (2013.01)

(58) Field of Classification Search
CPC .... F16D 25/0638; F16D 25/123; F16H 45/02; F16H 2045/021; F16H 2045/0215; F16H 2045/0221; F16H 2045/0284; F16H 57/0427

USPC ........................................... 192/85.27, 85.29
See application file for complete search history.

(56) References Cited

U.S. PATENT DOCUMENTS

| 5,417,315 A * | 5/1995 | Fukunaga | F16H 61/14 192/3.29 |
| 5,964,329 A * | 10/1999 | Kawaguchi | F16H 45/02 192/113.36 |
| 7,891,473 B2 * | 2/2011 | Maienschein | F16H 45/02 192/3.3 |

FOREIGN PATENT DOCUMENTS

DE    112008003612    5/2015

* cited by examiner

*Primary Examiner* — Richard M Lorence
(74) *Attorney, Agent, or Firm* — Cozen O'Connor

(57) ABSTRACT

A clutch arrangement has a first pressure chamber for exerting load clutch piston and a second pressure chamber for accommodating clutch elements and for feeding fluid for cooling the clutch elements. A first clutch element is connected to a first clutch element carrier and a second clutch element is connected to a second clutch element carrier. The first clutch element carrier accommodates the clutch piston and the second clutch element carrier exerts load on a torsional vibration damper and radially encloses the clutch unit over part of its axial extent length. The clutch piston is equipped with a flow passage for flow connection between the two pressure chambers, and the first clutch element carrier has a flow passage which interacts with a flow-guiding element provided on the second clutch element carrier, that is oriented relative to the flow passage of the first clutch element carrier at an angle.

9 Claims, 1 Drawing Sheet

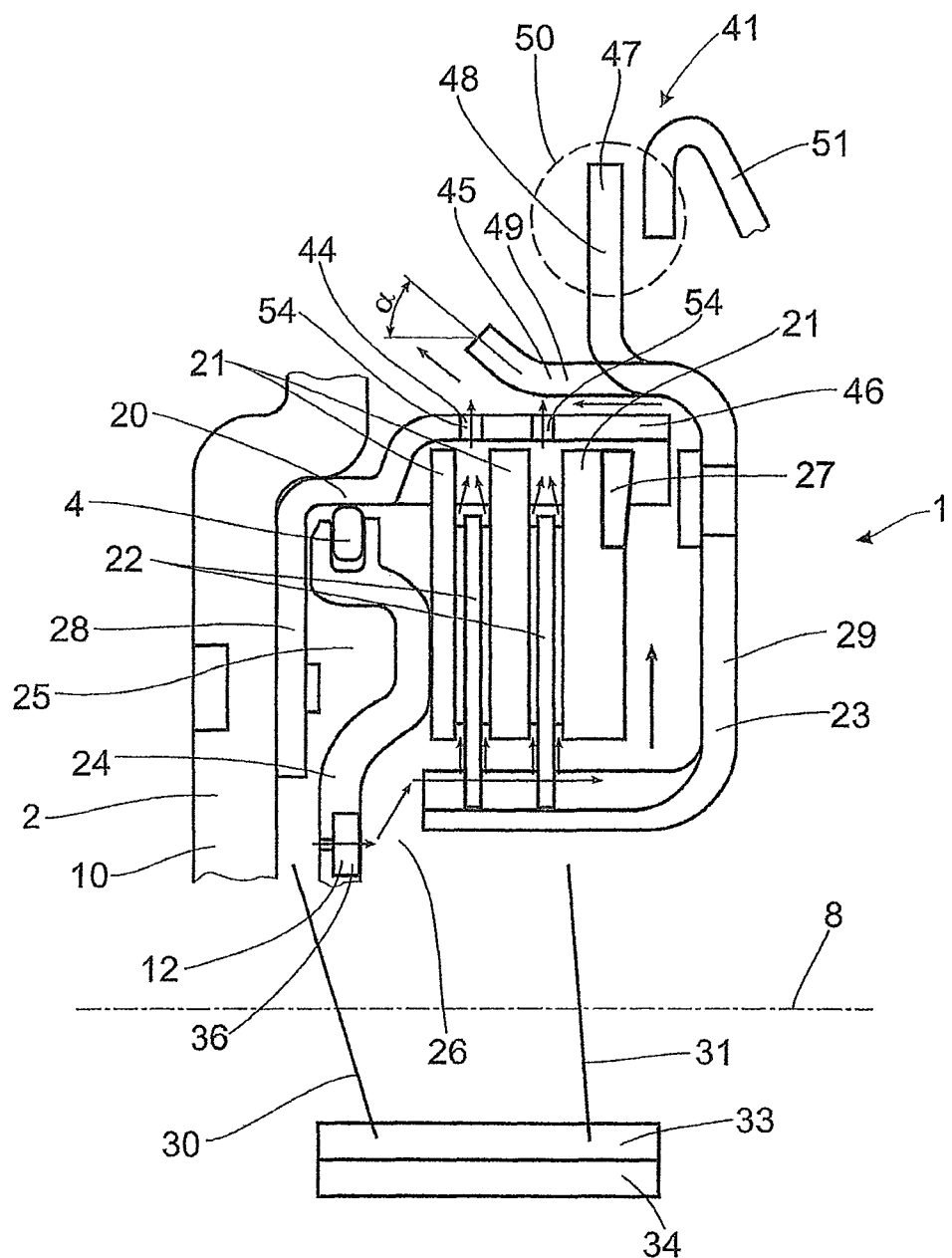

CLUTCH ARRANGEMENT

BACKGROUND OF THE INVENTION

1. Field of the Invention

The invention relates to a clutch arrangement having at least two pressure chambers provided in a clutch housing, a first pressure chamber serves for exerting load on a clutch piston and a second pressure chamber serves at least for accommodating clutch elements of a clutch unit and for feeding fluid for cooling the clutch elements, wherein at least one first clutch element is connected to a first clutch element carrier and at least one second clutch element is connected to a second clutch element carrier, of which the first clutch element carrier serves for accommodating the clutch piston and the second clutch element carrier serves for exerting load on a torsional vibration damper and for radially enclosing the clutch unit over at least a part of its axial extent length.

2. Description of Related Art

A clutch arrangement of said type is known from DE 11 2008 003 612 B4. The clutch arrangement accommodated in the clutch housing of a hydrodynamic torque converter has a radially inner clutch element carrier, which is supported by a torsional vibration damper, as first clutch element carrier, and a radially outer clutch element carrier, held on a turbine wheel, as second clutch element carrier. Both clutch element carriers each have a flow passage. Furthermore, the radially outer clutch element carrier is, over a part of its axial extent, enclosed by a substantially parallel-running output-side actuation element of the torsional vibration damper, by which actuation element the flow passage of the radially outer clutch element carrier is partially covered and to which actuation element the radially inner clutch element carrier is fastened.

Each clutch element carrier rotationally conjointly holds a multiplicity of clutch elements, which are placed in operative connection with one another when a positive pressure is set in the first pressure chamber, which extends axially between the radially outer clutch element carrier and the clutch piston, in relation to the second pressure chamber, which is situated at the opposite side of the clutch piston and which accommodates inter alia the clutch elements. The clutch arrangement is then engaged. Whereas the first pressure chamber is connected exclusively to a pressure line which extends with a radial component through a hub which is rotationally conjoint with a transmission input shaft, the second pressure chamber is connected to two pressure lines, each of which utilizes in each case one axial bearing arrangement as a passage radially to the outside. Of the two latter pressure lines, one serves for the feed of fluid into the clutch housing, and one serves for the discharge of fluid out of the clutch housing. On its path through the clutch housing, the fluid flows through the flow passages in the radially inner clutch element carrier and also in the radially outer clutch element carrier. Although the fluid is thus forced to flow through the clutch elements, such that this forced flow promotes good absorption of heat by the fluid from the clutch elements, which may have heated up in particular in the event of frictional slippage, it is however not ruled out that the forced flow, as it emerges from the flow passage of the radially outer clutch element carrier, is partially impeded by impingement on the output-side actuation element, which partially covers said flow passage, of the torsional vibration damper, and as a result a region of turbulence is generated which, for following-on fluid flowing in a radially inward direction, impedes the passage of said fluid through the flow passage of the radially outer clutch element carrier.

SUMMARY OF THE INVENTION

One aspect of the invention is based on optimizing the throughflow of a clutch arrangement such that the best possible exchange of heat between a fluid that serves for cooling and heated-up regions of the clutch arrangement is ensured.

According to one aspect of the invention, provision is made for using a clutch arrangement having at least two pressure chambers, which are provided in a clutch housing, a first pressure chamber serves for exerting load on a clutch piston and a second pressure chamber serves at least for accommodating clutch elements of a clutch unit and for feeding fluid for cooling the clutch elements, wherein at least one first clutch element is connected to a first clutch element carrier and at least one second clutch element is connected to a second clutch element carrier, of which the first clutch element carrier serves for accommodating the clutch piston and the second clutch element carrier serves for exerting load on a torsional vibration damper and for radially enclosing the clutch unit over at least a part of its axial extent length.

It is of particular importance here that the clutch piston is equipped with a passage for forming a flow connection between the two pressure chambers, and the first clutch element carrier has a flow passage that interacts with a flow-guiding element provided on the second clutch element carrier, which flow-guiding element is oriented relative to the flow passage of the first clutch element carrier at an angle α which avoids parallelism of flow passage and flow-guiding element.

The use of such a clutch arrangement is expedient in the case of a clutch housing, which is designed as a two-line system. In the case of such a two-line system, the two pressure chambers of the clutch housing are connected to in each case one single pressure line, which is formed with a pressure accumulator. The two pressure chambers are separated from one another in substantially pressure-tight fashion, such that the only connection between them is formed by the passage assigned to the clutch piston, wherein said passage preferably has a multiplicity of openings arranged offset with respect to one another in a circumferential direction.

If, for example, the first pressure chamber that extends axially between the clutch housing and the clutch piston is supplied with a positive pressure via the associated pressure line by way of a feed of fluid from the pressure accumulator, then not only is the clutch piston displaced in the direction of the clutch elements accommodated in the second pressure chamber in order to bring these into operative connection with one another and thus engage the clutch arrangement, but also, a part of the fluid fed from the pressure accumulator via the corresponding pressure line passes via the passage into the second pressure chamber and thus passes into that region of said second pressure chamber in which the clutch elements are provided. The clutch elements are flowed through radially by said fluid, for which purpose flow channels are commonly provided in friction linings of the clutch elements. Of the fluid that forms this flow, however, only a part can exit the first clutch element carrier via the flow passage thereof, whereas the remaining part of said fluid remains in a housing-like region formed by the first clutch element carrier, specifically in particular if the first clutch element carrier, by an axial projection, encloses at least one of the clutch elements in the manner of a housing. In said region, the friction linings, which are commonly equipped with flow channels, of the clutch elements, in conjunction with the rotational speed difference between the first, preferably drive-side clutch elements and the second, preferably output-side clutch elements, act as a pump, which circulate the fluid that has collected in the housing-like region formed by the first clutch element carrier, and thus considerably improve the exchange of heat that takes place in said region in any case, and thus considerably increase the cooling efficiency.

By contrast, that part of the fluid that exits the first clutch element carrier via the flow passage thereof impinges on the flow-guiding element provided on the second clutch element carrier, and is, owing to the orientation of said flow-guiding element at the angle α in relation to the flow passage of the first clutch element, diverted in a direction in which it is extremely expedient for the flow to be conducted onward in order to be discharged from the clutch housing with the least possible turbulence. This is the case in particular if the first clutch element carrier, and in this case in particular the axial projection thereof, is, over at least a part of its axial extent length, enclosed by the flow-guiding element of the second clutch element carrier in the manner of a housing, and fluid that has emerged via the flow passage impinges on the flow-guiding element.

It is particularly advantageous here if the second clutch element carrier comprises not only the flow-guiding element but furthermore also the at least one actuation element, which serves for exerting load on a torsional vibration damper. This yields a strong second clutch element carrier that can nevertheless be manufactured with a low weight and combines multiple functions in one structural unit. An embodiment for such a second clutch element carrier, which is particularly advantageous from a manufacturing aspect, is obtained if said second clutch element carrier is, in a circumferential direction, formed with a multiplicity of circumferential segments, of which at least one circumferential segment acts as the at least one actuation element for exerting load on the torsional vibration damper, whereas second circumferential segments each act as part of the flow-guiding element. The individual circumferential segments are preferably, by separation from one another and by bending in different directions, turned out of the second clutch element carrier.

A particularly advantageous overall arrangement for the clutch arrangement is realized if the first clutch element carrier is fastened to a housing cover of the clutch housing and the second clutch element carrier is equipped with at least one actuation element for exerting load on the torsional vibration damper.

BRIEF DESCRIPTION OF THE DRAWINGS

The subject matter of the application will be discussed in more detail below on the basis of a drawing, in which:

The FIGURE shows a clutch arrangement in a clutch housing having a clutch piston by which two pressure chambers are separated from one another, having a first clutch element carrier with an axial projection that encloses clutch elements in the manner of a housing, and having a second clutch element carrier that accommodates a flow-guiding element, which second clutch element carrier, with said flow-guiding element, encloses the first clutch element carrier over at least a part of its axial extent length in the manner of a housing.

DETAILED DESCRIPTION OF THE PRESENTLY PREFERRED EMBODIMENTS

The FIGURE illustrates a clutch arrangement 1, which is provided in a clutch housing 2 indicated by a housing cover 10. The clutch arrangement 1 may be part of a hydrodynamic torque converter, a hydraulic clutch, or a wet-running clutch.

The clutch housing 2 may, in a manner which is not shown, be connected rotationally conjointly to a drive (likewise not shown) such as an internal combustion engine, and, when rotational movement is input by the drive, performs a rotational movement about a central axis 8.

The housing cover 10 serves for accommodating a drive-side clutch element carrier 20 that serves as input 28 of the clutch arrangement 1 and which, by an axial projection 46, serves for rotationally conjointly holding drive-side clutch elements 21, which are functionally assigned output-side clutch elements 22 which engage rotationally conjointly into an output-side clutch element carrier 23. The drive-side clutch element carrier 20 engages, by a seal 4, around a clutch piston 24, which is centred in axially displaceable fashion on a hub. The clutch piston 24 is equipped with a multiplicity of openings 12 at predetermined circumferential intervals with respect to one another, which openings jointly serve as a flow passage 36.

The clutch piston 24, together with the housing cover 10, delimits a first pressure chamber 25, whereas a second pressure chamber 26 extends at the opposite side of the clutch piston 24. The supply to the pressure chambers 25, 26 is realized, in a manner not shown, from radially inside from a region directly surrounding the central axis 8. If a positive pressure is produced in the first pressure chamber 25 in relation to the second pressure chamber 26, then the clutch piston 24 is displaced in the direction of the clutch elements 21 and 22 in order to press these together after that drive-side clutch element 21, which is axially furthest remote from the clutch piston 24, has come into contact with an axial support 27. The clutch arrangement 1 is then engaged, and at least substantially transmits the torque originating from the housing cover 10 to its second clutch element carrier 23, which serves as output 29. Conversely, a positive pressure in the second pressure chamber 26 in relation to the first pressure chamber 25 will have the effect that the clutch piston 24 is displaced in the direction of the housing cover 10, and thus releases the clutch elements 21, 22. The clutch arrangement 1 is then disengaged, and transmits at least no substantial torque to its output-side clutch element carrier 23, which serves as output 29.

When a torque provided by the drive (not shown) is introduced, the torque is, when the clutch arrangement 1 is engaged, conducted from the housing 2 via the drive-side clutch element carrier 20 and the clutch elements 21 and 22 to the output-side clutch element carrier 23, which serves as output 29 of the clutch arrangement 1, and from said output-side clutch element carrier via actuation elements 47 to a torsional vibration damper 41, of which only one energy store 50 and one output-side actuation element 51 are schematically illustrated.

The output-side clutch element carrier 23, by a flow-guiding element 45, encloses the axial projection 46 of the first clutch element carrier 20 along a part of the extent length of said axial projection 46 and thus of the first clutch element carrier 20. In a region of the first clutch element carrier 20 in which the axial projection 46 has a flow passage 44 in the form of openings 54, the flow-guiding element 45 is led outward with a radial component at an angle α. Parallelism of flow passage 44 and flow-guiding element 45 is this avoided, such that fluid exiting the flow passage 44 is diverted in the desired direction by the flow-guiding element 45.

The actuation elements 47, which interact with the torsional vibration damper 41, are provided on first circumferential segments 48 of the second clutch element carrier 23, whereas second circumferential segments 49 act as part of the flow-guiding element 45. The individual circumferential segments 48 and 49 are produced by separation from one another and by bending in different directions out of the second clutch element carrier (23).

The FIGURE is intended to illustrate the clutch piston 24 in a two-line system 40. The pressure chamber 25 is connected to a first pressure line 30, and the second pressure chamber 26, which extends at the opposite side of the clutch piston 24, is connected to a pressure line 31. If the pressure in the second pressure chamber 26 is higher than that in the first pressure chamber 25, and the clutch arrangement 1 is thus disengaged, then the pressure line 31 serves as a fluid inflow, wherein said fluid passes to the clutch elements 21 and 22 but, owing to the seal 4 in the radially outer region of the clutch piston 24, not imperatively into the first pressure chamber 25. A flow passage 36 is thus required in the clutch piston 24 in order, via said flow passage 36, to be able to discharge fluid from the second pressure chamber 26 into the first pressure chamber 25 and from there via the first pressure line 30 into a pressure accumulator 34, wherein the path of the fluid into the pressure accumulator 34 may lead via a fluid cooler 33. By contrast, if the pressure in the first pressure chamber 25 is, via the first pressure line 30, increased beyond the pressure in the second pressure chamber 26, and the clutch arrangement 1 is engaged, then the fluid can likewise pass only via the flow passage 36 in the clutch piston 24 from the first pressure chamber 25 into the second pressure chamber 26, and from there via the second clutch element carrier 23 and the clutch elements 21 and 22 to the flow passage 44 of the first clutch element carrier 20. After being diverted on the flow-guiding element 45, the fluid is finally conducted on a path which is not shown, for example by the torsional vibration damper 41, to the second pressure line 31, and from the latter into the pressure accumulator 34, possibly via the fluid cooler 33. Accordingly, in the two-line system 41, the flow passage 36 in the clutch piston 24 is imperatively necessary in order for fresh fluid to be introduced from the pressure accumulator 34 into one of the pressure chambers 25 or 26 and to thus be available for the cooling of the clutch elements 21 and 22.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A clutch arrangement comprising:
   a clutch housing;
   a clutch unit having clutch elements;
   at least two pressure chambers which are provided in the clutch housing, a first pressure chamber configured to exert a load on a clutch piston and a second pressure chamber configured to at least accommodate the clutch elements of the clutch unit and for feeding fluid for cooling the clutch elements;
   at least one first clutch element connected to a first clutch element carrier; and
   at least one second clutch element connected to a second clutch element carrier,
   wherein the first clutch element carrier is configured to accommodate the clutch piston and the second clutch element carrier is configured to exert load on a torsional vibration damper and for radially enclosing the clutch unit over at least a part of its axial extent length,
   wherein the clutch piston is equipped with a flow passage for forming a flow connection between the at least two pressure chambers,
   wherein the first clutch element carrier has a flow passage which interacts with a flow-guiding element provided on the second clutch element carrier,
   wherein the flow passage of the first clutch element carrier extends radially through the first clutch element carrier, and
   wherein the flow-guiding element is oriented relative to the flow passage of the first clutch element carrier at an angle (α) which avoids parallelism of flow passage and flow-guiding element.

2. The clutch arrangement according to claim 1, wherein the flow passage of the clutch piston has a multiplicity of openings that are arranged offset with respect to one another in a circumferential direction.

3. The clutch arrangement according to claim 1, wherein the first clutch element carrier encloses at least one of the clutch elements as a housing by an axial projection, and is itself, over at least a part of its axial extent length, enclosed by the flow-guiding element as a housing, such that fluid that has passed via the flow passage of the clutch piston to the clutch elements impinges, after flowing through said clutch elements, via the flow passage of the first clutch element carrier, is diverted by the flow-guiding element at an angle (α) which avoids parallelism of flow passage and flow-guiding element.

4. The clutch arrangement according to claim 1, wherein the first clutch element carrier is fastened to a housing cover of the clutch housing, and the second clutch element carrier is equipped with at least one actuation element for exerting load on the torsional vibration damper.

5. The clutch arrangement according to claim 4, wherein the second clutch element carrier is, in a circumferential direction, formed with a multiplicity of circumferential segments, of which at least a first circumferential segment acts as the at least one actuation element for exerting load on the torsional vibration damper, and second circumferential segments each act as part of the flow-guiding element.

6. The clutch arrangement according to claim 5, wherein the multiplicity of circumferential segments are, by separation from one another and by bending in different directions, turned out of the second clutch element carrier.

7. The clutch arrangement according to claim 1, wherein the flow passage through the first clutch element carrier is substantially perpendicular to an axis of rotation of the clutch unit.

8. The clutch arrangement according to claim 1, wherein the first clutch element carrier extends axially in a first direction and the second clutch element carrier and the flow-guiding element extend axially in a second direction opposite the first direction.

9. The clutch arrangement according to claim 1, wherein the flow passage of the clutch piston for forming the flow connection between the at least two pressure chambers extends axially through the clutch piston.

* * * * *